Patented Feb. 24, 1931

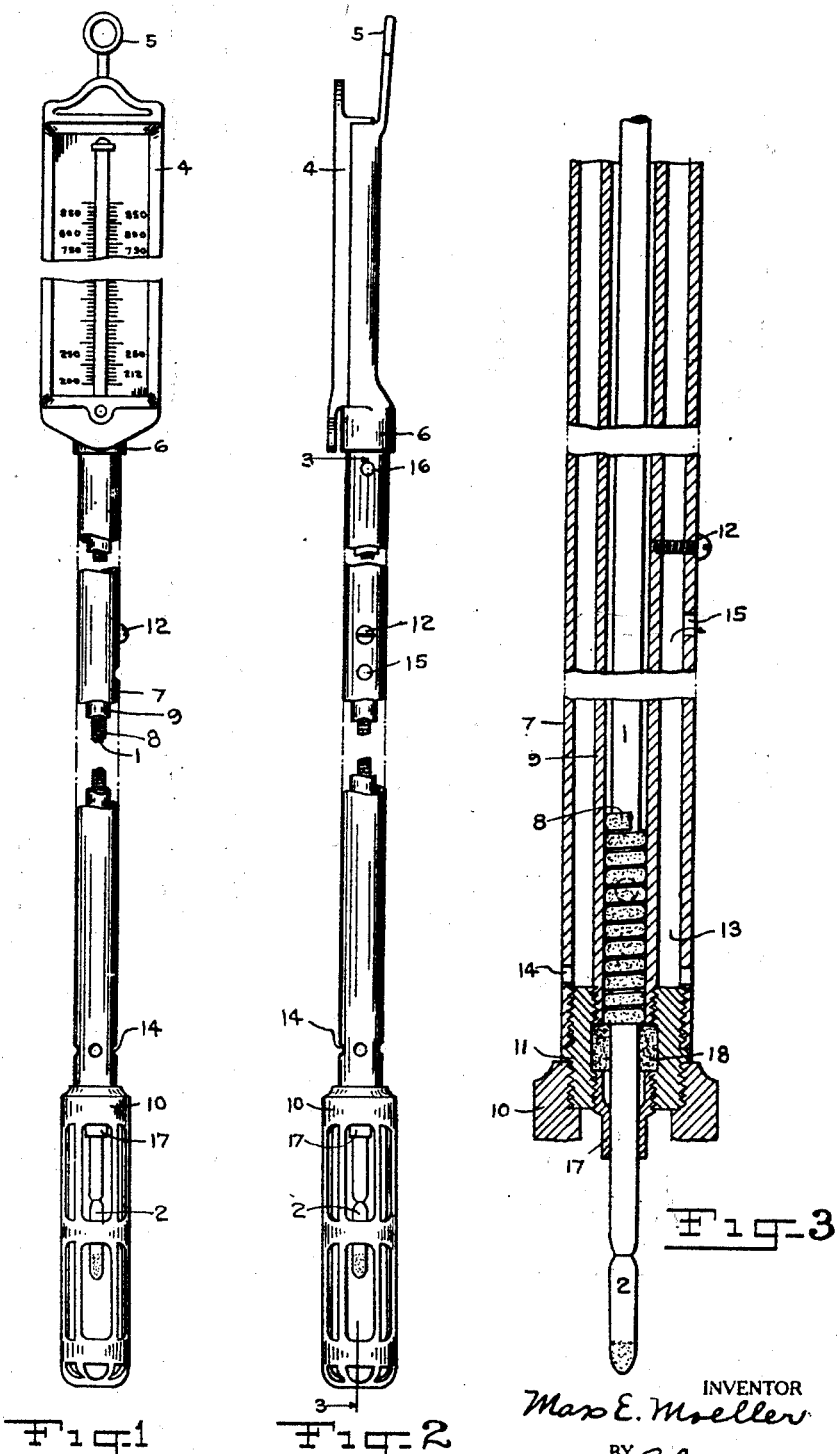

1,793,950

UNITED STATES PATENT OFFICE

MAX E. MOELLER, OF BROOKLYN, NEW YORK, ASSIGNOR, BY MESNE ASSIGNMENTS, TO MOELLER INSTRUMENT COMPANY, INC., OF BROOKLYN, NEW YORK, A CORPORATION OF NEW YORK

THERMOMETER

Application filed December 11, 1923. Serial No. 679,898.

The improvements relate to thermometers having an unusually long tube or stem. Such thermometers are used for indicating the temperature of liquids while they are being boiled or cooked or maintained in a liquid state at high temperature, for instance, in the cooking or boiling operations of sugar juices and syrups, glue, varnish, printing inks, and in the melting of lead, type metal and other metals having a relatively low melting point. As large quantities are commonly treated, the vessels are often several feet in depth, and as the thermometer scale, in most cases must be above the top of the vessel in order to be easily read, the stem of the thermometer between the bulb and the scale must have a considerable length, often three feet or more. It is necessary also in most cases that the temperature of the heated liquid be observed throughout the cooking or heating operation, and this requires that the thermometer shall remain in the heated liquid for a relatively long period of time, this period running as high as three or four hours in some cases.

A present construction of the stem in such thermometers comprises a tube of metal surrounding the stem of the thermometer and extending from the bulb at the bottom to the scale at the top provided with packing of asbestos or other insulating material between it and the stem, the lower end of the tube being closed for the purpose of excluding the heated liquid. It has been found in practice however that it is not possible to securely seal the lower end of the tube, where the stem of the thermometer near the bulb projects therethrough, and the result is that the heated liquid will in time find its way into the interior of the tube and saturate the insulating material, so that it no longer insulates the stem of the thermometer but permits it to become highly heated, thus causing the scale to give a higher reading than that to which it has been calibrated, and therefore to become inaccurate. Even before the insulating material has become saturated, it is not possible to insure approximately accurate temperature indications, owing to the fact that exposure of the outer tube to the high temperature of the liquid for any considerable period will cause heat to radiate and be conducted to a certain extent through the packing of insulating material, so that the reading of the thermometer will vary according to the temperature and the period of exposure. Therefore, as the thermometer must be calibrated at a given temperature and period of exposure, it will be more or less inaccurate for all other temperatures and periods. The variations in temperature are also affected by the particular nature and heat conductivity of the liquid, and the depth to which the thermometer stem is immersed therein.

Nor can the difficulty be overcome by dispensing with the insulating packing, for in that case the liquid will find its way into the interior of the surrounding tube, become trapped therein and harden, and have a tendency, on account of its contraction and expansion, to crack the stem. In the course of time, also, the tube would become partly filled with the hardened substance, which would form a conductor of heat. In addition to this the long attenuated form of the glass thermometer stem should be supported and reinforced against shocks and vibration within the outer tube.

The present improvements are designed to overcome these difficulties, and this is accomplished by first placing the thermometer stem in a metallic tube of relatively small diameter, and then placing this tube, with the stem therein, in a much larger tube having openings at its lower part and at points higher up, through which the liquid may flow freely into the annular space between the two tubes so as to have access to the inner tube and through which the liquid may escape when the thermometer is removed from the boiler or other retort, the upper openings also serving as vents for vapor, steam and other gases, and liquid mixed with air or gas in the form of foam or other form. The improvements therefore, instead of seeking to prevent access of the liquid to the inner tube, contemplate the free access of the liquid thereto, and a heating of the entire stem of the thermometer to substantially the temperature of the body of liquid, thus enabling the maker to calibrate the instrument under normal conditions of use, strengthening and reinforcing the stem, and enabling him to replace the glass thermometer proper when necessary without specially calibrating the new instrument, to adjust it to a changed condition of the other parts.

The improvements also provide an instrument which will give a quick reading of any temperature, and facilitate cleaning of the instrument, by immersing it in a solvent fluid. This is seldom necessary however owing to the fact that any liquid which may harden on the surfaces of the tubes will merely form a heat conducting coating.

The improvements are illustrated in the accompanying drawings, in which Fig. 1 is a front view of a long-stemmed thermometer embodying the improvements; Fig. 2 is a side elevation thereof; and Fig. 3 is a vertical medial section of the tubes surrounding the stem of the thermometer, with the thermometer and the wrapping of its stem shown in elevation therein, parts being broken away medially in each view and foreshortened.

The thermometer proper consists of a stem or tube 1, having a bulb 2 at its lower end, and a scale with which its upper end is connected, the said scale being in a suitable housing 4 provided with a hanger 5, by which the entire instrument may be handled or suspended. The lower tubular extremity 6 of the scale housing receives the upper end of the outer tube 7, which encloses the stem, and is secured in said tubular portion, and on the lower end of this tube a protecting cage 10 enclosing the lower end of the tube and its bulb is threaded. This is accomplished by means of a hollow plug 11 threaded into the lower end of the tube 7, and having the upper end of the cage 10 engaging on its exterior immediately below the bottom of the tube.

The thermometer stem 1 is wound with a strip or filament 8 of asbestos or other soft insulating material, extending from end to end of its protecting tube 9, and forming a thin spacing cushion between the said stem and tube. This cushion or packing may have any form suitable for the purpose, which is to cushion and support against vibration within the tube the stem of the thermometer, without insulating it to any material extent from the fluid surrounding the latter. The upper end of the tube 9 is preferably secured in the upper end of the tube 7 in substantially the same manner as its lower end, and a setscrew 12 threaded into the outer tube and having its point entering a recess in the inner tube holds the two tubes against relative rotary movement.

The lower end of the tube 9 is exteriorly threaded and engages the interiorly threaded upper portion of the hollow plug 11, so that the tubes 7 and 9 are securely held in spaced relation to provide an annular channel 13 between them from end to end, in which fluid entering through the openings 14 may circulate freely. Openings 15 in the tube 7 are provided at its upper part, and through these openings fluid may also enter if the instrument is immersed to a sufficient depth. They are intended however to permit the escape of vapor and gases and froth which has a tendency to rise in the tube to a considerable distance above the level of the body of liquid. A vent hole 16 is also provided at the top of the tube for vapor, heated air or other gases arising therein. In this manner the free access of the fluid to the interior of the tube and the protecting shell of the thermometer stem is provided for and the communication of the heat thereof to the entire length of the stem is insured, the heat being conducted laterally and longitudinally by the metallic tube 9, and the fluid, vapors &c. in the annular chamber communicating heat thereto; and it will be found that the temperature of the inner tube 9, and the resulting temperature of the stem 1 will be substantially uniform throughout, after a short exposure to the heat of the fluid to be tested.

A small tubular plug 17 is threaded into the lower end of the bore of the plug 11, and through this the lower portion of the thermometer stem extends, so that the stem is held and reinforced thereby. A packing 18, of any suitable compressible material is located between the extremities of the tube 9 and the plug 17, so that when the said parts are screwed up tight an effective stuffing will be provided.

What I claim is:

1. In a device of the character described, the combination with a thermometer having a bulb, an elongated stem and a scale at its upper portion, of a surrounding and enclosing structure comprising a tube surrounding the stem of the thermometer, a second tube surrounding said first named tube and spaced therefrom to provide an annular chamber therebetween, said second tube being adapted to be immersed with the bulb in a fluid to be tested for temperature, and having openings at its lower part through which the fluid may pass freely to the interior of said tube and between it and the first named tube.

2. In combination with the structure specified in claim 1, a hollow plug receiving the ends of the two tubes and having a portion interposed therebetween to secure them in spaced relation, and a second hollow plug threaded into the lower part of the bore of the first hollow plug but having its upper end spaced from the lower end of the said first named tube.

3. In combination with the structure specified in claim 1, a hollow plug receiving the ends of the two tubes and having a portion interposed therebetween to secure them in spaced relation, a second hollow plug threaded into the lower part of the bore of the first hollow plug but having its upper end spaced from the lower end of the said first named tube, a packing material within the bore of the first plug between the ends of the said second plug and the tube and surrounding the said stem.

Witness my hand this 6th day of December, 1923, at the city of New York, in the county and State of New York.

MAX E. MOELLER.